Feb. 18, 1930.　　　C. P. DEIBEL　　　1,747,757
DRY CELL BATTERY UNIT AND CASING THEREFOR
Filed Dec. 19, 1928　　　2 Sheets-Sheet 1
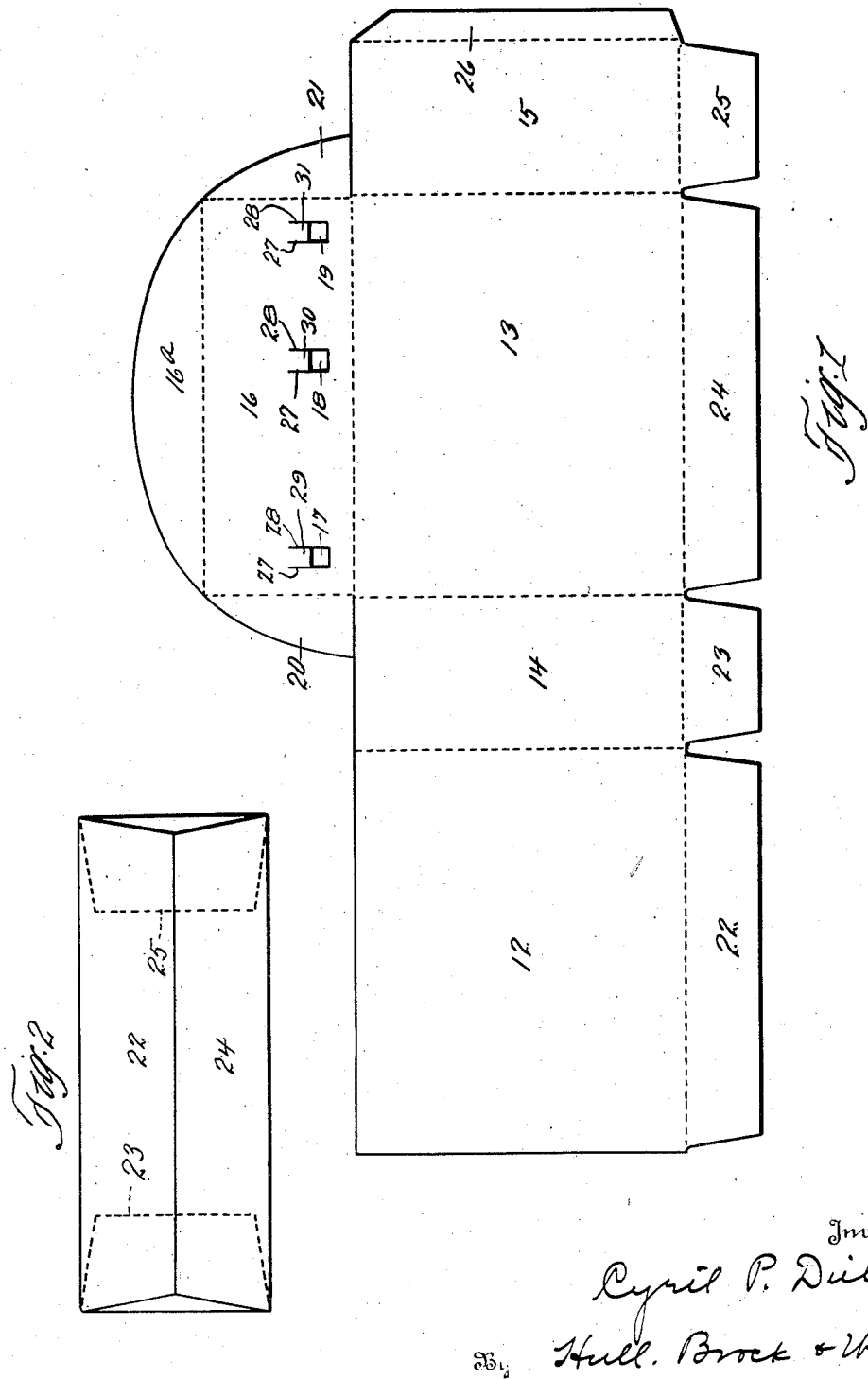
Inventor
Cyril P. Deibel
By Hull, Brock & West
Attorney

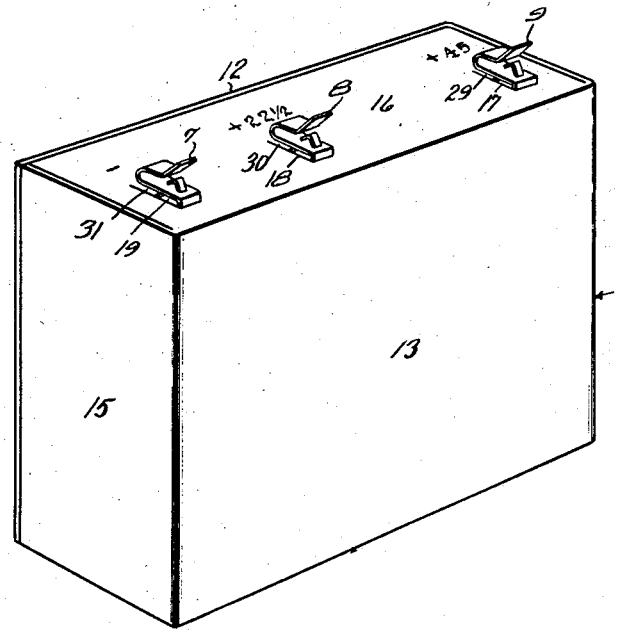
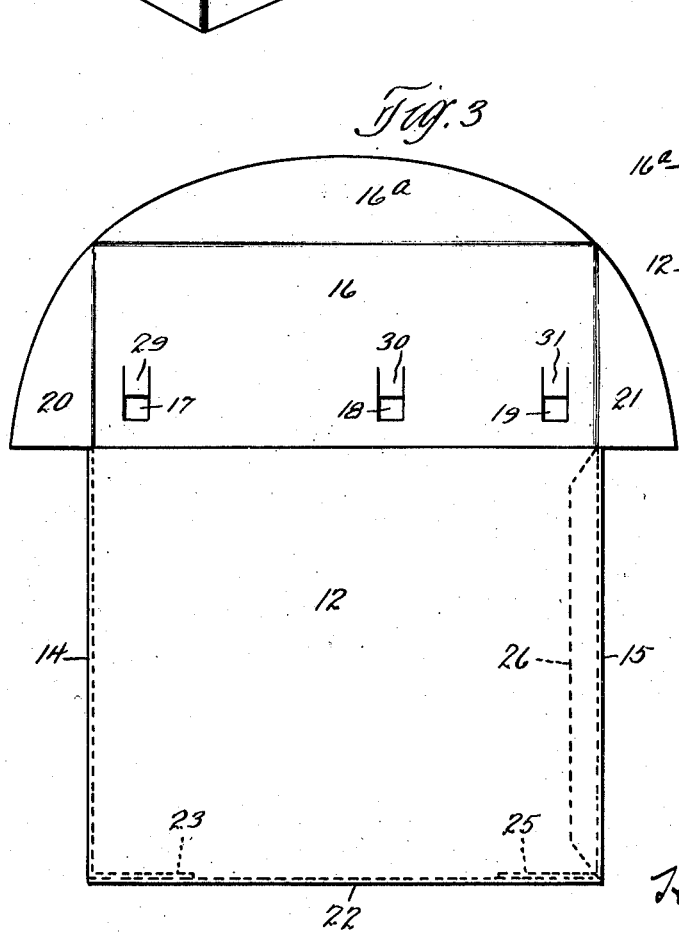
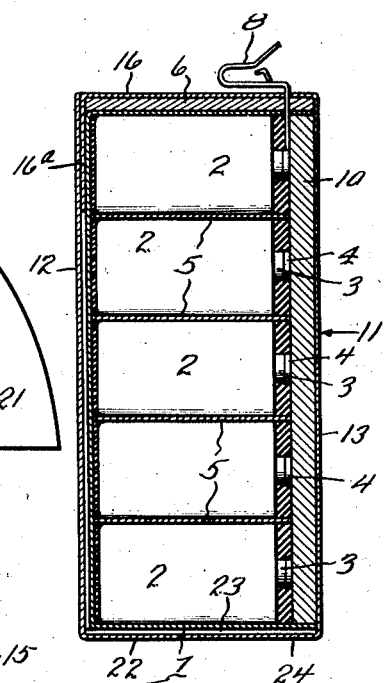

Patented Feb. 18, 1930

1,747,757

UNITED STATES PATENT OFFICE

CYRIL P. DEIBEL, OF LAKEWOOD, OHIO, ASSIGNOR TO GENERAL DRY BATTERIES, INC., OF CLEVELAND, OHIO, A CORPORATION OF OHIO

DRY-CELL BATTERY UNIT AND CASING THEREFOR

Application filed December 19, 1928. Serial No. 326,936.

This invention relates generally to dry batteries and more particularly to so called B batteries which are used in connection with radio receiving sets.

The usual practice in making batteries of this general type has been to arrange a number of cells vertically within individual compartments in an inner container in such a manner that the cells are insulated from each other. The cells are preferably connected in series, certain cells being connected to terminals or binding posts. The inner container is then sealed with suitable pitch, tar or wax and then inserted into an outer carton or casing in such a position that the vertical axis of each cell is in a horizontal position when the carton is in the upright position. The cover of the carton is usually provided with suitable openings through which the terminals or line attaching clips project.

The main object of this invention is to provide an exceedingly simple and dependable dry battery unit of this general character which is neat and pleasing in appearance and in which the outer carton is well adapted for quantity production at a low cost.

A further object of the invention is to provide an outer carton or casing for battery units of the character described having suitable openings in the cover portion thereof which are so spaced and designed that the cover of the same can be closed only when the battery is in the correct position with respect to voltage and polarity marking on the cover.

A further object of the invention is to provide a dry battery unit of the character described in which the terminals or line attaching clips are rigidly and firmly held in place and in which the openings in the outer carton are so arranged as to properly locate the inner container with respect to the outer carton.

Another object of the invention is to provide an outer carton or casing for dry cell battery units which is made from a single piece of material and which is provided with suitable flaps or projecting portions by means of which the carton is closed, the top of the carton being provided with a plurality of openings so designed and arranged as to provide suitable openings through which the attaching clips project.

A still further object of the invention is to provide a carton for battery units of the character set forth which includes a reinforcing member or strip which cooperates with the carton to provide a rigid and dependable support for the line attaching clips.

Further and more limited objects of the invention will appear as the description proceeds and by reference to the accompanying drawing in which Fig. 1 is a plan view of the blank from which the outer carton or casing is formed; Fig. 2 is a plan view of the bottom of the carton; Fig. 3 is a view in front elevation of the battery unit with the cover opened; Fig. 4 is a vertical sectional view through the battery unit and Fig. 5 is a perspective view of the battery unit complete.

Referring now to the drawings, the reference character 1 designates an inner container, preferably rectangular in shape and which may be formed of paper, cardboard or other suitable material. Arranged within the container 1 are a plurality of dry cells 2 which are insulated one from the other and connected in series in a manner well known to those skilled in the art. According to the preferred embodiment of my invention, each cell consists essentially of a zinc can which serves as the negative electrode and which contains a mass of depolarizing mix and a centrally disposed carbon electrode 3 over the upper end of which is secured a cap 4, preferably of brass. According to the preferred method of assembling the unit, the bottom of the inner container is first coated with a thin layer of suitable tar or pitch and the container is divided into a plurality of individual compartments by means of right angularly disposed partitions 5. The partitions 5 have their lower ends embedded in the layer of tar or pitch so that the bottom of each compartment is sealed. After the cells are arranged within the inner container and connected in series, each compartment is filled with a layer of suitable tar or pitch which bonds with the side walls thereof.

In order to provide terminals for the battery unit, I provide a reinforcing member 6 which may be made of some suitable material such as wood or cardboard and which is of substantially the same shape and size as the end wall of the inner container. The reinforcing member 6 is provided preferably with three slots spaced apart as shown and through which are projected terminal clips 7, 8 and 9 of the brass spring type. The stems of the clips and the slots in the reinforcing member 6 are of such shape as to resist a turning movement of the clips with respect to the reinforcing member. The inner ends of the clips project through similar shaped openings in the end wall of the inner container 1. The inner ends of the clips 8 and 9 are soldered to the carbon caps 5 of two different cells and the inner end of the clip 7 is connected with the zinc can of another cell, as shown in my copending application Serial No. 326,937 filed December 19, 1928. The top of the inner container 1 is then closed by a piece of cardboard 10 which fits neatly within the inner container 1. This whole assembly is then inserted into the outer container or carton 11. The blank from which the carton 11 is formed is disclosed in detail in Fig. 1 and consists essentially of a single piece of material, preferably cardboard, having side walls 12 and 13 and end walls 14 and 15. Formed integral with the side wall 13 is a cover portion 16 in the form of a flap which is provided with openings 17, 18 and 19 of the shape shown most clearly in Fig. 1 and which are preferably disposed adjacent one edge thereof. The openings 17, 18 and 19 are preferably rectangular in shape and are spaced an unequal distance apart, the purpose of which will hereinafter appear.

Formed integral with the cover portion 16 are tabs or flaps 20 and 21 which serve to secure the cover in closed position. Formed integral with the side and end walls respectively are flaps 22, 23, 24 and 25 the opposite edges of which converge inwardly toward each other, as shown in Fig. 1 and which are adapted to be folded to form the bottom of the outer carton or casing. Formed integral with the end wall 15 is a tab 26 to which the opposite edges of the side wall 12 is secured preferably by being glued thereto. The cover portion 16 has a flap 16ª formed integral therewith and which together with the flaps 20 and 21 is tucked within the outer container or carton to secure the cover in closed position. The bottom of the carton 11 is formed by folding the flaps 22, 23, 24 and 25 to the position shown in Fig. 2 and securing the same in place preferably by gluing. The inner container 1 with the cells secured therein and connected as described is then inserted into the outer carton or casing 11. The cover is then closed and the flaps 16ª, 20 and 21 are then tucked between the inner container and the outer container with the brass spring clips projecting through the openings 17, 18 and 19, as shown in Fig. 5.

The cover portion 16 adjacent each of the openings 17, 18 and 19 is provided with slits 27 and 28 which constitute extensions of the sides of the openings. The slits provide tabs 29, 30 and 31 which are readily movable to permit the clips 7, 8 and 9 to be projected through the openings and which may then be pressed back into the position shown in Figs. 4 and 5 to substantially close the openings. The openings 17, 18 and 19 being disposed an unequal distance apart and adjacent one edge of the cover, provide a construction in which the cover for the outer container can be closed only when the inner container is placed in the outer carton in the correct position with respect to the marking on the cover thus rendering it extremely difficult to reverse the polarity of the battery.

Various changes may be made in the details of construction and in the shape, size and arrangement of the various parts without departing from the spirit of my invention and the embodiment of the invention herein disclosed should be considered merely as illustrative and not in a limiting sense and it is understood that my invention is limited only in accordance with the scope of the appended claims.

Having thus described my invention, what I claim is:—

1. A battery unit of the character described comprising an inner container having a plurality of dry cells arranged therein and electrically connected with each other, an outer carton enclosing said inner container and having a flap constituting a cover therefor, said flap having a plurality of openings therein spaced apart unequal distances, a plurality of line attaching clips connected with said cells and adapted to project through said openings respectively when said cover is closed, said openings being so spaced with respect to said clips that said cover can be closed only when the inner container occupies a correct position with respect to said outer carton and suitable indicia on said outer carton indicating the polarity of the battery unit.

2. A battery unit of the character described comprising an inner container having a plurality of dry cells arranged therein and electrically connected with each other, a carton enclosing said inner container and having a cover portion provided with at least three openings spaced different distances from one edge thereof, at least three line attaching clips connected with said cells and adapted to project through said openings when the cover is closed, said openings being so spaced and arranged with respect to said clips that said cover can be closed only when the container occupies the correct position with respect to said carton and suitable indicia indicating the polarity of the battery unit.

3. A battery unit of the character described comprising an inner container and a plurality of dry cells arranged therein and electrically connected with each other, a carton enclosing said inner container and having a portion having at least three openings therein, at least three line attaching clips connected with said cells and adapted to project through said openings when the inner container is properly positioned within the carton, said openings and clips being so spaced and arranged that said container can be properly secured within the carton only when the container occupies the correct position with respect to said carton and suitable indicia indicating the polarity of the battery.

In testimony whereof, I hereunto affix my signature.

CYRIL P. DEIBEL.